(Model.)
J. F. WEITZEL.
Vegetable Grater and Slicer.
No. 228,147. Patented May 25, 1880.
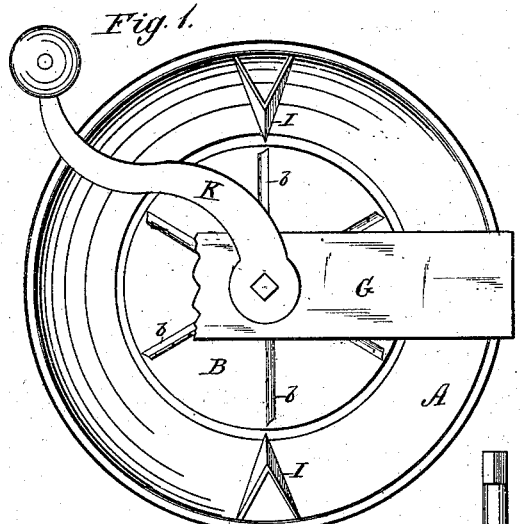
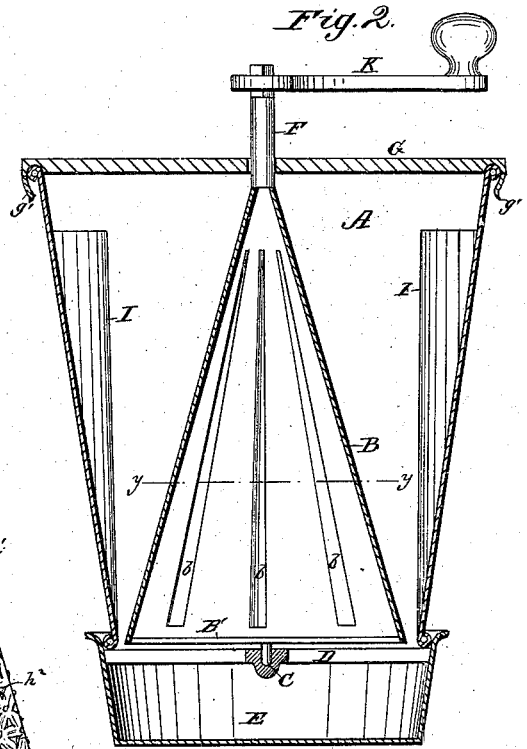
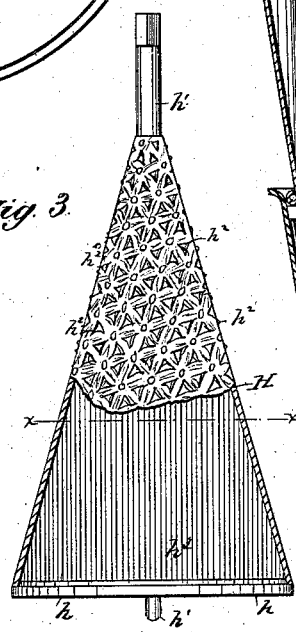
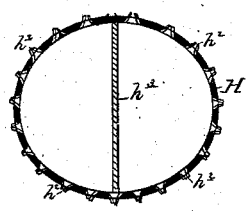
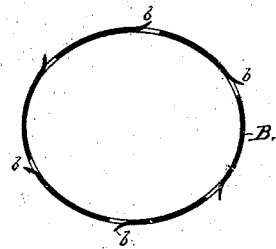
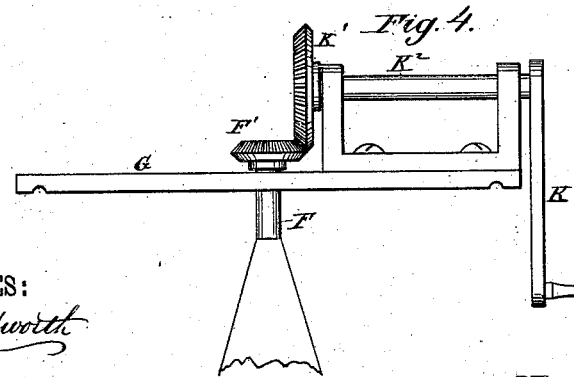
WITNESSES:
W. W. Hollingsworth
Solon C. Kemon
INVENTOR:
Jacob F. Weitzel
BY
ATTORNEYS.

UNITED STATES PATENT OFFICE.

JACOB F. WEITZEL, OF GALVESTON, TEXAS.

VEGETABLE GRATER AND SLICER.

SPECIFICATION forming part of Letters Patent No. 228,147, dated May 25, 1880.

Application filed March 20, 1880. (Model.)

*To all whom it may concern:*

Be it known that I, JACOB F. WEITZEL, of Galveston, Galveston county, and State of Texas, have invented a new and Improved Vegetable Grater and Slicer; and I do hereby declare that the following is a full, clear, and exact description of the same.

My invention relates to an improvement upon that form of vegetable grater or slicer in which a tapering bucket or receptacle is made largest at the top, and is combined with a concentric and cone-shaped grater or slicer whose base rests close to the bottom edge of the bucket, and which cone-shaped grater or slicer is arranged to revolve and act upon the fruit or vegetables which wedge themselves by gravity down into the annular space.

My invention consists, first, in making the cone-shaped slicer or grater in oblate or elongated form in cross-section, to improve the cutting action, and in combining the conical cutter and the reversely-tapering bucket with a subjacent detachable pan carrying a spider-frame with a socket to receive the end of the spindle of the cone-shaped cutter, as hereinafter fully described.

In the accompanying drawings, Figure 1 is a plan view with the bridge-plate that supports the upper end of the spindle partly broken away, with the slicing-cylinder in place; Fig. 2, a vertical central section of the same; Fig. 3, an elevation of the grating-cylinder detached; Fig. 4, a detached view of bridge-plate, showing a modification of the crank and gearing. Figs. 5 and 6 are cross-sections of the two conical forms of cutters, taken respectively through lines $x$ $x$ and $y$ $y$, and showing the elongated or oblate form of the same.

A tapering bucket, A, with its larger diameter at the top, serves as the receptacle for the vegetables to be operated upon, and is open at the top and bottom. A cutting or slicing cone, B, is provided with a plate, B', at its lower end, that extends diametrically across the cylinder, and is secured thereto, and has a stud-spindle, C, secured to the plate B' in line with the central axis of the cone. The slicing-cone rests upon and is supported by a spider-plate, D, the central portion of which is depressed to form a step for the stud-spindle of the cutting-cone. The plate or spider D rests in a pan, E, the upper rim of which fits snugly around the outer rim of the lower end of the bucket, so that the bucket will also rest upon the spider-plate.

The upper end of the slicing-cone is provided with a spindle, F, that passes through a bridge-plate, G, which forms a bearing for it, and supports the cone in a vertical position and permits it to revolve freely. The ends of the bridge-plate G may be flanged at the sides to stiffen them, and are turned down or hooked at their ends $g'$ to embrace the rim of the bucket A between them and the ends of the flanges $g$. A sufficiently-firm connection of parts is thus obtained, which admit of being readily taken apart for cleaning or removing the cutter.

The upper end of the spindle may, as in this instance, be made square to receive the eye of a crank-handle, K, so that the cutting-cone may be turned horizontally in a simple manner.

A bevel-gear pinion, F', may be attached to the end of the shaft, if desired, as shown in Fig. 4, to mesh with a similar gear, K', upon the end of a counter-shaft, K², journaled to brackets upon the bridge-plate G, and provided with a crank-handle, K, at its end, to more conveniently and easily rotate the cutting-cone at an increased speed.

The cutting-cone B has slots $b$ $b$ in its sides, at equal distances from each other, so that the slots will extend from the base to the upper end of the cone and receive knife-blades, the cutting-edges of which project from its surface and are secured to the cone by suitable means, which will admit of their ready removal to sharpen them, and so as to leave a portion of the slot uncovered for the sliced portion of the vegetable to pass through into the interior of the cone and fall into the receptacle at the bottom thereof.

The grating-cone H is similar to the slicing-cone in general shape and in being provided at its base with cross-plates $h$ $h$, to hold a stud-spindle in line with its central axis, and also in having a stud-spindle, $h'$, secured to its upper end, to which the crank-gearing is to be attached. The bridge-plate G also supports it at its upper end, and both the grating-cone H and slicing-cone B are of such shape, dimensions, and proportions that one may be readily substituted for the other, the only material difference between them being that slicer B is provided with longitudinal knives, and the grater H has its surface reticulated, the metal being cut in radial lines and punched through from the inside surface of the plate to leave projecting spurs $h^2\ h^2$, and to form a grating-surface upon the outside of the cone in a well-known manner.

A plate, $h^3$, is placed diametrically across the interior of the grating-cone, and extends from end to end thereof, and serves to materially stiffen it, so that its contour will be unchanged by any ordinary pressure that may be brought upon it.

The interior surface of the bucket A may be provided with projecting prismoidal ribs I, that extend from its upper to its lower rims, two or more of which may be employed, that serve as abutments to prevent the vegetables from slipping while under the cutting operation, and serve a good effect in causing regularity in the shape of the slices. The ribs I may be easily made removable by flanges upon their base, that engage with guide-strips upon the inner surface of the bucket, so that they may be readily slid into place or removed for cleaning the bucket.

The cutting and slicing cones are of peculiar shape to better facilitate the cutting operation and permit the vegetables to be fed automatically by their gravity. This object is obtained by flattening the cone upon its opposite sides, so that the cones will be slightly elliptical or oval in cross-section, and its diameter through the flattened side will be somewhat shorter than a diameter at right angles thereto. This difference of diameters may be a quarter of an inch, or thereabout, so that as the long diameter comes opposite the vegetable it will fall and press it more closely between the sides of the cone and the bucket to prevent it from slipping during the cutting operation. This feature of my device is considered of the utmost importance, and its objects are so evident as to require no description here. This feature of the flattened cone is equally applicable to the cutting and grating cone.

The cone may be made of cast metal, tinned to prevent rust, if it is desired to secure greater strength than heavy sheet metal. Interior cross-braces and a cast-metal ring and spider at the base of the cylinder are, however, deemed sufficient, as shown in Fig. 3.

The spider D may be cast separately and loosely fitted into the pan E, so that it may be removed for cleaning the pan; or it may be loosely fitted into the bottom of the bucket A, and the bucket A may be supported upon a leg-base, if desired, so that any pan may be used for catching the cuttings.

What I claim as new is—

1. The combination, with a bucket open at top and bottom, of a conical cutter revolving therein, and made elongated or oval in cross-section to facilitate cutting action and feeding the vegetables downward, substantially as and for the purpose described.

2. The combination, with the bucket A, having open ends, and the cone B, having lower bearing, C, of the detachable pan E, carrying spider-frame D, containing a socket for the bearing of the cone, substantially as shown and described.

JACOB F. WEITZEL.

Witnesses:
WM. SELKIRK,
JULIUS F. LOBENSTEIN.